United States Patent
Choi et al.

(10) Patent No.: US 9,621,519 B2
(45) Date of Patent: Apr. 11, 2017

(54) SYSTEM AND METHOD FOR KEY EXCHANGE BASED ON AUTHENTICATION INFORMATION

(71) Applicant: SAMSUNG SDS CO., LTD., Seoul (KR)

(72) Inventors: Kyu-Young Choi, Seoul (KR); Ji-Hoon Cho, Seoul (KR); Hyo-Jin Yoon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 151 days.

(21) Appl. No.: 14/576,628

(22) Filed: Dec. 19, 2014

(65) Prior Publication Data

US 2016/0072775 A1 Mar. 10, 2016

(30) Foreign Application Priority Data

Sep. 5, 2014 (KR) ......................... 10-2014-0119260

(51) Int. Cl.
H04L 29/06 (2006.01)

(52) U.S. Cl.
CPC ........ H04L 63/0428 (2013.01); H04L 63/061 (2013.01); H04L 63/08 (2013.01)

(58) Field of Classification Search
CPC .......................... H04L 63/0428; H04L 63/061
See application file for complete search history.

(56) References Cited

U.S. PATENT DOCUMENTS

| | | | | |
|---|---|---|---|---|
| 7,793,102 B2* | 9/2010 | Malville | ............. | H04L 63/0428 380/270 |
| 2003/0217270 A1* | 11/2003 | Nakayama | ............. | G06F 21/31 713/172 |
| 2004/0039919 A1* | 2/2004 | Takayama | ............. | G06Q 20/04 713/180 |
| 2004/0111615 A1* | 6/2004 | Nyang | ................. | H04L 9/3218 713/168 |
| 2005/0111666 A1* | 5/2005 | Blom | ................. | H04L 63/0428 380/277 |
| 2006/0168253 A1* | 7/2006 | Baba | ..................... | H04L 9/3271 709/229 |

(Continued)

OTHER PUBLICATIONS

Exponent Group Signature Schemes and Efficient Identity Based Signature Schemes Based on Pairings, F. Hess, Dept. Computer Science, Universiy of Bristol, Merchant Ventures Building, Woodland Road.*

*Primary Examiner* — Taghu Arani
*Assistant Examiner* — Phy Anh Vu
(74) *Attorney, Agent, or Firm* — Sughrue Mion, PLLC (57) ABSTRACT

Disclosed are a system and method for exchanging a key based on user authentication information. The system for exchanging a key based on user authentication information includes a terminal configured to generate an ID-based ciphertext corresponding to authentication information of a user of the terminal using a terminal-side random number and a server ID and a server configured to decrypt the ID-based ciphertext that is received from the terminal using a server-side private key corresponding to the server ID to restore the authentication information, authenticate the terminal using the restored authentication information, and generate a server-side session key corresponding to the authenticated terminal.

23 Claims, 3 Drawing Sheets

(56) References Cited

U.S. PATENT DOCUMENTS

| | | | | |
|---|---|---|---|---|
| 2010/0211779 A1* | 8/2010 | Sundaram | ............ | H04L 9/3073 |
| | | | | 713/168 |
| 2012/0179906 A1* | 7/2012 | Choi | .................... | H04L 9/0891 |
| | | | | 713/155 |
| 2014/0122888 A1* | 5/2014 | Yoon | .................... | H04L 9/0844 |
| | | | | 713/171 |
| 2015/0019868 A1* | 1/2015 | Lee | ....................... | H04L 9/0847 |
| | | | | 713/170 |
| 2015/0039883 A1* | 2/2015 | Yoon | .................... | H04L 9/0847 |
| | | | | 713/155 |
| 2016/0330179 A1* | 11/2016 | Choi | .................... | H04L 9/0819 |

* cited by examiner

SYSTEM AND METHOD FOR KEY EXCHANGE BASED ON AUTHENTICATION INFORMATION

CROSS-REFERENCE TO RELATED APPLICATION

This application claims priority to and the benefit of Korean Patent Application No. 10-2014-0119260, filed on Sep. 5, 2014, the disclosure of which is incorporated herein by reference in its entirety.

BACKGROUND

1. Field

Embodiments of the present disclosure relate to a security technology on a network.

2. Discussion of Related Art

Password authenticated key exchange (PAKE) is a process in which two or more parties that participate in communication share a key for encrypted communication based only on their knowledge of a password. PAKE may be classified into public-key-certificate-based PAKE and non-public-key-certificate-based PAKE according to the implementation method.

The public-key-certificate-based PAKE always requires a procedure for performing public-key authentication for key exchange, and the non-public-key-certificate-based PAKE (associated standards: IEEE P1363.2 and ISO/IEC 11770-4) has a configuration scheme with a verifier in which a password is directly exponentiated, and stored and thus migration of an existing system and update of parameters are difficult. Also, for this scheme, since a password is directly combined with group parameters, a relatively large amount of calculation is required, and it is impossible for a message flow of a protocol to be flexible.

SUMMARY

The present disclosure is directed to provide an efficient authentication and key exchange protocol having all advantages of public-key-certificate-based PAKE and non-public-key-certificate-based PAKE by applying an ID-based encryption technology to an existing authentication-information-based key exchange protocol.

The present disclosure is also directed to minimizing the number of communications needed for the authentication and key exchange.

According to an aspect of the present disclosure, there is provided a system for exchanging a key based on user authentication information, the system including: a terminal implemented by one or more hardware processors configured to generate an ID-based ciphertext corresponding to authentication information of a user of the terminal using a terminal-side random number and a server ID; and a server implemented by one or more hardware processors configured to decrypt the ID-based ciphertext that is received from the terminal using a server-side private key corresponding to the server ID to restore the authentication information, authenticate the terminal using the restored authentication information, and generate a server-side session key corresponding to the authenticated terminal.

The terminal may calculate a first session key element from the terminal-side random number, generate a terminal-side encryption element from the server ID and the terminal-side random number, and combine the authentication information with the terminal-side encryption element to generate an encryption character string.

The terminal-side encryption element may be calculated using a following equation: $D=(H(ID_S))^x$, where D is a terminal-side encryption element, IDs is a server ID, x is a terminal-side random number, and H is a unidirectional hash or hash value.

The encryption character string may be calculated by an exclusive OR (XOR) between the authentication information and the terminal-side encryption element.

The server may receive an ID-based ciphertext including the first session key element and the encryption character string from the terminal, calculate a server-side encryption element from the server-side private key and the first session key element, and restore the authentication information from the encryption character string using the server-side encryption element.

The server-side encryption element may be calculated using a following equation: $D'=X^{Ks}$, where D' is a server-side encryption element, X is a first session key element, and Ks is a server-side private key.

The authentication information may be restored through an exclusive OR (XOR) between the received encryption character string and server-side encryption element.

The server may authenticate the terminal according to whether the restored authentication information is the same as the authentication information of the terminal that is previously stored in the server.

The server may calculate a second session key element from a server-side random number when the terminal is authenticated and generate a server-side third session key element from the server-side random number and the first session key element.

The server-side third session key element may be calculated by exponentiation having the first session key element as a base and the server-side random number as an index.

The terminal may receive the second session key element from the server and generate a terminal-side third session key element and a terminal-side session key from the received second session key element.

The terminal-side third session key element may be calculated by exponentiating a base of the second session key element to a power of the terminal-side random number.

The terminal-side session key sk may be a hash value of a character string including one or more of the terminal ID, the server ID, the encryption character string, the first session key element, the second session key element, the terminal-side encryption element, and the terminal-side third session key element.

The server-side session key may be a hash value of a character string including one or more of the terminal ID, the server ID, the encryption character string, the first session key element, the second session key element, the server-side encryption element, and the server-side third session key element.

According to another aspect of the present disclosure, there is provided a method for exchanging a key based on user authentication information, the method including: generating, by a terminal, an ID-based ciphertext corresponding to authentication information of a user of the terminal using a terminal-side random number and a server ID; decrypting, by a server, the ID-based ciphertext that is received from the terminal using a server-side private key corresponding to the server ID to restore the authentication information; authenticating, by the server, the terminal using the restored authentication information; and generating a server-side session key corresponding to the authenticated terminal when the terminal is authenticated.

The generating of the ID-based ciphertext may further include: calculating a first session key element from the terminal-side random number; generating a terminal-side encryption element from the server ID and the terminal-side random number; and combining the authentication information with the terminal-side encryption element to generate an encryption character string.

The terminal-side encryption element is calculated using a following equation: $D=(H(ID_S))^x$, where D is a terminal-side encryption element, IDs is a server ID, x is a terminal-side random number, and H is a unidirectional hash value.

The encryption character string may be calculated by an exclusive OR (XOR) between the authentication information and the terminal-side encryption element.

The restoring of the authentication information may further include: receiving an ID-based ciphertext including the first session key element and the encryption character string from the terminal; calculating a server-side encryption element from the server-side private key and the first session key element; and restoring the authentication information from the encryption character string using the server-side encryption element.

The server-side encryption element may be calculated using a following equation: $D'=X^{Ks}$, where D' is a server-side encryption element, X is a first session key element, and Ks is a server-side private key.

The restoring of the authentication information may include restoring the authentication information through an exclusive OR (XOR) between the encryption character string and the server-side encryption element.

The authenticating may include authenticating the terminal according to whether the restored authentication information is the same as the authentication information of the terminal that is previously stored in the server.

The generating of the server-side session key may further include: calculating a second session key element from a server-side random number; and generating a server-side third session key element from the server-side random number and the first session key element.

The server-side third session key element may be calculated by exponentiating a base of the first session key element to a power of the server-side random number.

The terminal may receive the second session key element from the server and generate a terminal-side third session key element and a terminal-side session key from the received second session key element.

The terminal-side third session key element may be calculated by exponentiating a base of the second session key element to a power of the terminal-side random number.

The terminal-side session key sk may be a hash value of a character string including one or more of the terminal ID, the server ID, the encryption character string, the first session key element, the second session key element, the terminal-side encryption element, and the terminal-side third session key element.

The server-side session key sk' may be a hash value of a character string including one or more of the terminal ID, the server ID, the encryption character string, the first session key element, the second session key element, the server-side encryption element, and the server-side third session key element.

According to still another aspect of the present disclosure, there is provided a computer program stored in a medium that is combined with hardware and configured to execute a method, the method including: generating an ID-based ciphertext corresponding to authentication information of a user of a terminal using a terminal-side random number and a server ID; decrypting the ID-based ciphertext that is received from the terminal using a server-side private key corresponding to the server ID to restore the authentication information; authenticating the terminal using the restored authentication information; and generating a server-side session key corresponding to the authenticated terminal when the terminal is authenticated.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the accompanying drawings. However, this is only exemplary, and the present disclosure is not limited thereto.

In describing the present disclosure, when it is determined that detailed description of known techniques associated with the present disclosure would unnecessarily obscure the gist of the present disclosure, the detailed description thereof will be omitted. Also, the terms described below are defined in consideration of the functions in the present disclosure, and thus may vary depending on a user, intention of an operator, or custom. Accordingly, the terms will be defined based on the whole specification.

The technical scope of the present disclosure is defined by the claims, and the following embodiments are intended only to explain the technical scope of the present disclosure to those skilled in the art.

Figure 1:
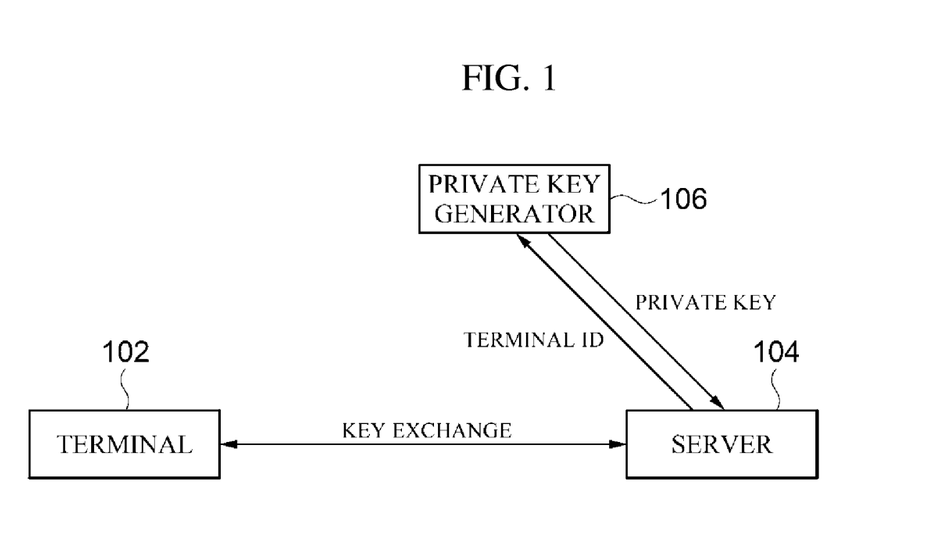
FIG. 1 is a block diagram showing an authentication-information-based authentication system 100 according to an example embodiment of the present disclosure.

FIG. 1 is a block diagram showing an authentication-information-based authentication system 100 according to an example embodiment of the present disclosure. As shown in FIG. 1, the authentication-information-based authentication system 100 includes a terminal 102, a server 104, and a private key generator 106.

The terminal 102 selects a terminal-side random number x and generates an ID-based ciphertext (X, W) corresponding to authentication information of a user of the terminal 102 using the terminal-side random number x and an ID of the server 104. In an example embodiment of the present disclosure, the ID of the server 104 is information that is assigned to identify the server 104 on a network and may include a media access control (MAC) address or an Internet protocol (IP) address of the server 104. In addition, the authentication information of the user of the terminal 102 may include all kinds of information needed to authenticate the user, such as a password, fingerprint information, and the like of the user.

When the ID-based ciphertext (X, W) is generated, the terminal 102 transmits the ID-based ciphertext (X, W) to the server 104 to request authentication.

The server 104 stores and manages the authentication information of the user of the terminal 102. In this case, the authentication information may include all information needed to authenticate the user, such as a password, fingerprint information, and the like of the user. In an example embodiment, the user of the terminal 102 may set his or her own identifier IDc and password pw and register the identifier IDc and password pw with the server 104. In this case, the user of the terminal 102 may register the password pw without change or may register a unidirectional hash value of the password H(pw) or a message authentication code (MAC) value $MACK_k(pw)$ that is calculated using a separate hardware security module (HSM) instead of the password pw. For convenience of description, it is assumed below that the authentication information is the unidirectional hash value of the password H(pw).

The server 104 decrypts the ID-based ciphertext (X, W) that is received from the terminal using a server-side private key Ks corresponding to the server identifier IDs to restore the authentication information of the user and compares the restored authentication information with authentication information that the user has previously registered with the server 104 to authenticate the terminal 102. That is, the server 104 may directly authenticate the terminal through the authentication information of the terminal 102 that is included in the ID-based ciphertext (X, W) received from the terminal 102. In addition, since the decryption of the ID-based ciphertext (X, W) is performed by only the server 104, the terminal 102 also performs implicit authentication on the server 104 through the authentication process.

When the authentication of the terminal 102 succeeds, the server 104 generates a session key sk for communication with the authenticated terminal 102. In addition, through this process, the server 104 selects a server-side random number y and transmits a second session key element Y that is generated using the selected server-side random number y to the terminal 102. Upon receiving the second session key element Y, the terminal 102 generates the same session key sk as that of the server 104, using the second session key element Y and information that is used through the authentication process.

The private key generator 106 receives an ID of the server 104 IDs from the server and issues a server-side private key Ks corresponding to the received identifier IDs. The stored server-side private key Ks is used to decrypt the ID-based ciphertext (X, W) that is received from the terminal 102 through a subsequent authentication process.

In an example embodiment, the private key generator 106 may calculate a server-side private key Ks corresponding to the server identifier IDs based on predetermined system parameters, its own master key, and previously-calculated data corresponding to a trapdoor discrete logarithm group. The method of generating the server-side private key Ks will be described below in detail.

Figure 2:
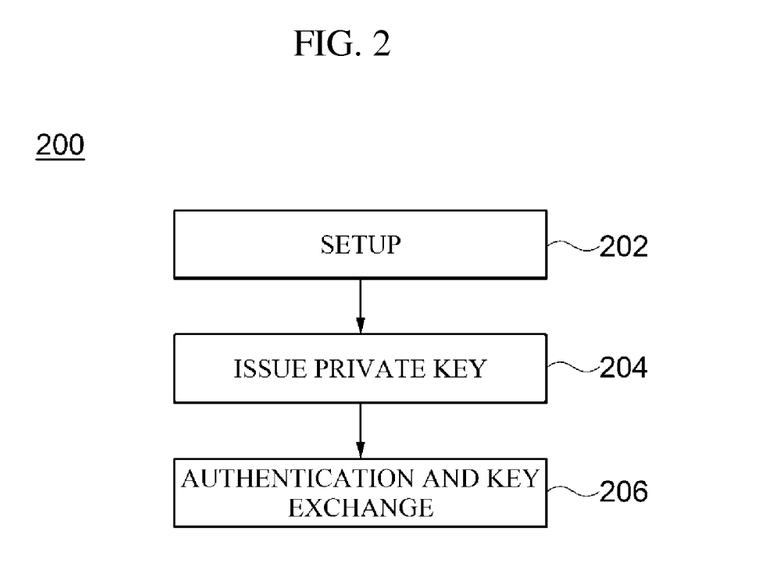
FIG. 2 is a flowchart illustrating entire operations of an authentication-information-based authentication algorithm 200 according to an example embodiment of the present disclosure.

An authentication method that is performed by the authentication-information-based authentication system 100 having the above-described configuration will be described in detail. As shown in FIG. 2, an authentication-information-based authentication method 200 according to an example embodiment of the present disclosure includes a setup operation 202, a server-side private key issuing operation 204, and a key exchange operation 206. In the setup operation 202, all elements of a system are defined. In the server-side private key issuing operation 204, the private key generator 106 generates a server-side private key Ks corresponding to a server identifier IDs based on a master key according to a request of the server 104. In the key exchange operation 206, authentication between the terminal 102 and the server 104 is performed to generate a session key sk.

Setup Operation 202

In an example embodiment of the present disclosure, the setup operation is an operation for defining a parameter and a master key that are used for authentication and key exchange between the terminal 102 and the server 104.

First, N=pq is calculated from two large prime numbers p and q which satisfy $p \equiv 3 \pmod 4$ and $q \equiv 3 \pmod 4$, and are B-smooth numbers of similar sizes. Each of p and q is a prime number that satisfies a security level corresponding to a given stability parameter. The stability parameter denotes an element of an algorithm that determines time and cost of a basic attack against an encryption algorithm. In this case, the basic attack denotes an attack that uses an exhaustive search method of searching for all possible key candidates until a key that satisfies given data (plaintext and ciphertext) is found. Since a time taken in the exhaustive search depends on the number of possible keys and the number of keys is determined based on lengths of the keys, the stability parameter denotes the lengths of the keys in this case. Also, a value B may be set appropriately for the security level.

Next, a hash function H and a random hash function h are defined. It is assumed that a generator of a maximal cyclic subgroup of a finite group $Z_N = \{0, 1, 2, \ldots, N-1\}$ is $\tilde{g}$. When a cyclic subgroup generated by the generator g k' is defined as G, the hash function H is defined as Equation 1 below.

$$H: \{0,1\}^* \to G \quad \text{[Equation 1]}$$

where $\{0,1\}^*$ is any finite bit string that consists of 0s and 1s.

That is, the hash function H defines that an output value is an element of the group G when a given ID is considered as an input value. For example, when there is the random hash function $h': \{0,1\}^* \to Z_n$, the hash function H may be determined as Equation 2 below.

$$H(ID) = h'(ID)^2 \quad \text{[Equation 2]}$$

In addition, the hash function h is defined as Equation 3 below.

$$h: \{0,1\}^* \to \{0,1\}^n \quad \text{[Equation 3]}$$

where $\{0,1\}^n$ is a character string of n bits that consist of any bits of 0s and 1s.

For example, SHA1, SHA-256, SHA-512, and the like may be used as the random hash function. However, the present disclosure is not limited thereto.

A system parameter param and a master key mk that are derived through the above process are as follows.

param={N, G, g, H, h} mk=(p, q)

Server-Side Private Key Issuing Operation 204

This operation is an operation for issuing a server-side private key Ks based on a server identifier IDs that is received from the server 104. The private key generator 106 calculates a private key corresponding to a given ID based on the system parameter param and master key mk and the previously-calculated data corresponding to a trapdoor discrete logarithm (TDL) group. A discrete logarithm calculation is cryptologically impossible. However, when a trapdoor is known, there is a group in which a discrete logarithm value may be easily calculated, which is referred to as the TDL group. The present disclosure calculates a private key corresponding to each ID using a property of the TDL group. That is, the private key generator calculates a private key corresponding to the received ID, using the master key and the previously calculated data for respective values corresponding to the TDL group, for example, the ID that is stored and received in a table and the previously calculated data that is stored in the table. For example, the private key generator 106 may calculate the server-side private key Ks as Equation 4 below.

$$Ks = \log_g(H(IDs)) \quad \text{[Equation 4]}$$

The calculated private key Ks is delivered to the server 104 through a stable channel.

Authentication and Key Exchange Operation 206

Figure 3:
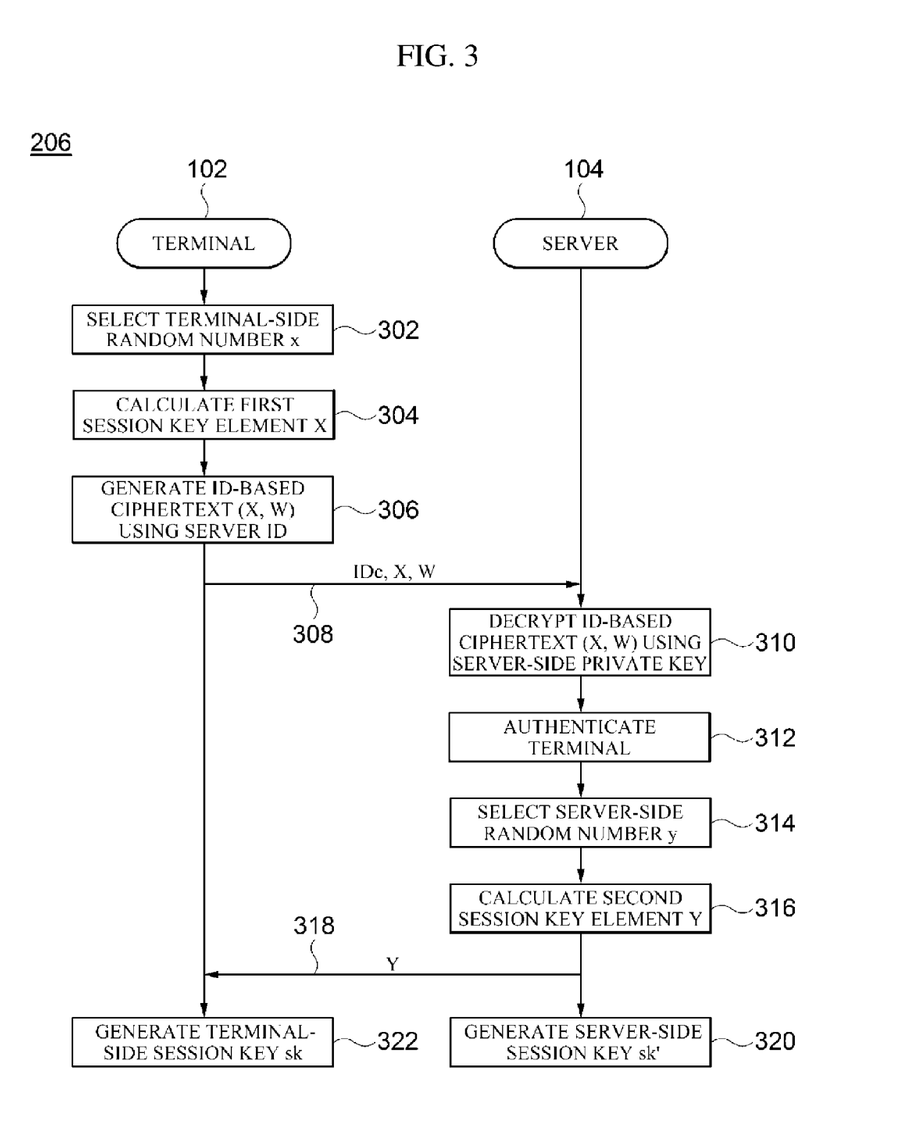
FIG. 3 is a flowchart illustrating an authentication and key exchange operation 206 of the authentication-information-based authentication algorithm 200 according to an example embodiment of the present disclosure in detail.

This operation is an operation for performing authentication between the terminal 102 and the server 104 and generating a session key sk. FIG. 3 is a flowchart illustrating an authentication and key exchange operation 206 according to an example embodiment of the present disclosure in detail.

In operation 302, the terminal 102 selects any terminal-side random number x from among the group $Z_N$ according to the system parameter defined in operation 202.

In operation 304, the terminal 102 calculates a first session key element X from the terminal-side random number x (302). In this case, the first session key element X may be calculated using Equation 5 below.

$$X = g^x \quad \text{[Equation 5]}$$

where g is a generator of the cyclic subgroup G.

In operation 306, the terminal 102 generates an ID-based ciphertext (X, W) using a server identifier IDs. In this case, the ID-based ciphertext (X, W) denotes an encrypted value of the authentication information of the user of the terminal 102. In addition, the ID-based ciphertext (X, W) may additionally include a value (for example, $g^x$) needed to generate a session key other than the authentication information. The ID-based ciphertext (X, W) will be described in detail as follows.

First, the terminal 102 generates a terminal-side encryption element D, as in Equation 6 below, using the server identifier IDs and the terminal-side random number x.

$$D = (H(ID_S))^x \quad \text{[Equation 6]}$$

where D is a terminal-side encryption element, IDs is a server ID, x is a terminal-side random number, and H is a one-direction hash value.

Subsequently, the terminal 102 combines the authentication information with the terminal-side encryption element D to generate an encryption character string W. When the authentication information is assumed to be the one-direction hash value of a user password H(pw), the encryption character string W may be calculated by an exclusive OR (XOR) between the authentication information and the terminal-side encryption element D, as in Equation 7 below.

$$W = D \text{ XOR } H(pw) \quad \text{[Equation 7]}$$

In operation 308, the terminal 102 transmits the ID-based ciphertext (X, W) including the first session key element X and the encryption character string W in addition to the identifier IDc of the user terminal.

In operation 310, the server 104 decrypts the received ID-based ciphertext (X, W) using the server-side private key Ks. Specifically, the server 104 calculates a server-side encryption element D', as in Equation 8 below, using the server-side private key Ks and the first session key element X.

$$D' = X^{Ks} \quad \text{[Equation 8]}$$

where D' is a server-side encryption element, X is a first session key element, and Ks is a server-side private key.

In this case, if the server-side private key Ks is generated normally from the server identifier IDs, the server-side encryption element D' has the same value as the terminal-side encryption element D.

Next, the server 104 restores the authentication information from the encryption character string W using the server-side encryption element D'. This is represented as Equation 9 below.

$$H'(pw) = W \text{ XOR } D' \quad \text{[Equation 9]}$$

That is, the authentication information may be restored through an exclusive OR (XOR) between the received encryption character string W and the server-side encryption element D'.

In operation 312, the server 104 authenticates the terminal 102 according to whether the restored authentication information H'(pw) is the same as the authentication information H(pw) of the terminal that is previously stored in the server. If H'(pw) is the same as H(pw), the server 104 determines that the terminal 102 is authenticated, and otherwise, the server 104 determines that the terminal 102 is not authenticated.

In addition, as described above, when the server 104 does not have an accurate server-side private key Ks corresponding to the server identifier IDs, operation 310 may be properly performed. Accordingly, the terminal 102 may also indirectly authenticate the server 104 according to the result value of the authentication.

In operation 314, the server 104 selects any server-side random number y from among the $Z_N$ group according to a system parameter that is defined in operation 202.

In operation 316, the server 104 calculates a second session key element Y from the server-side random number y. The second session key element Y may be calculated using Equation 10 below.

$$Y = g^y \quad \text{[Equation 10]}$$

where g is a generator of the cyclic subgroup G, N is an integer that satisfies N=pq, and p and q are prime numbers that satisfy p≡3 (mod 4) and q≡3 (mod 4).

In operation 318, the server 104 transmits the generated second session key element Y to the terminal 102.

In operation 320, the server 104 generates a server-side session key sk' using information that is generated or exchanged in the previous operation.

Specifically, the server 104 generates a server-side third session key element Z', as in Equation 11 below, from the server-side random number y and the first session key element X.

$$Z' = X^y \quad \text{[Equation 11]}$$

Next, the server 104 generates the server-side session key sk' by hashing a character string including one or more of a terminal identifier IDc, a server identifier IDs, an encryption character string W, a first session key element X, a second session key element Y, a server-side encryption element D', and a server-side third session key element Z'. For example, the server-side session key sk' may be generated using Equation 12 below.

$$sk' = H(IDc, IDs, W, X, Y, D', Z') \quad \text{[Equation 12]}$$

In operation 322, the terminal 102 also generates the terminal-side session key sk using the information that is generated or exchanged in the previous operation.

Specifically, the terminal 102 generates the terminal-side third session key element Z, as in Equation 13 below, from the terminal-side random number x and the second session key element Y.

$$Z=Y^x \quad \text{[Equation 13]}$$

In this case, the terminal-side third session key element Z is the same as the server-side third session key element Z'.

Next, the terminal 102 generates the terminal-side session key sk by hashing a character string including one or more of a terminal identifier IDc, a server identifier IDs, an encryption character string W, a first session key element X, a second session key element Y, a terminal-side encryption element D, and a terminal-side third session key element Z. For example, the terminal-side session key sk may be generated using Equation 14 below.

$$sk=H(IDc,IDs,W,X,Y,D,Z) \quad \text{[Equation 14]}$$

As described above, since the terminal-side encryption element D and the terminal-side third session key element Z are the same as the server-side encryption element D' and the server-side third session key element Z', respectively, the terminal-side session key sk is the same as the server-side session key sk'. That is, during the above-described process, the terminal 102 and the server 104 may share a session key for safe communication between the terminal 102 and the server 104 without directly transmitting and receiving the key.

According to embodiments of the present disclosure, it is possible to efficiently and safely authenticate a terminal using authentication information of a user, and particularly, to initially perform authentication on the terminal by a server, thereby effectively coping with a DDoS attack and the like.

It is also possible to set the number of communications that are needed to authenticate a terminal and generate a session key as at least two passes.

Embodiments of the present disclosure may include a computer-readable recording medium including a program for performing methods described in this specification on a computer. The computer-readable recording medium may include a program instruction, a local data file, a local data structure, or a combination thereof. The medium may be designed and configured specifically for the present disclosure or can be widely known to and used by those skilled in the art of computer software. Examples of the computer-readable recording medium include a magnetic medium, such as a hard disk, a floppy disk, and a magnetic tape, an optical recording medium, such as a CD-ROM, a DVD, etc., a magneto-optical medium such as a floptical disc, and a hardware device specially configured to store and perform a program instruction, such as a ROM, a RAM, a flash memory, etc. Examples of the program instruction include a high-level language code executable by a computer with an interpreter, in addition to a machine language code made by a compiler.

Although the disclosure has been described with reference to exemplary embodiments, it will be understood by those skilled in the art that various changes may be made without departing from the spirit or scope of the disclosure.

Thus, the scope of the present disclosure is to be determined by the following claims and their equivalents, and shall not be restricted or limited by the foregoing detailed description.

What is claimed is:

1. A system for exchanging a key based on terminal user authentication information, comprising:
a terminal implemented by at least one hardware processor configured to generate an ID-based ciphertext, corresponding to the terminal user authentication information, using a terminal-side random number and a server ID; and
a server implemented by at least one hardware processor configured to decrypt the ID-based ciphertext generated by the terminal, using a server-side private key corresponding to the server ID, to produce restored terminal user authentication information;
the server being further configured to authenticate the terminal, using the restored terminal user authentication information, whereby the terminal is an authenticated terminal; and
the server being further configured to generate a server-side session key corresponding to the authenticated terminal, calculate a second session key element from a server-side random number when the terminal is authenticated, and to generate a server-side third session key element from the server-side random number and a first session key element;
wherein the terminal is further configured to:
calculate the first session key element from the terminal-side random number,
generate a terminal-side encryption element from the server ID and the terminal-side random number, and
combine the terminal user authentication information with the terminal-side encryption element to generate an encryption character string upon which the ID-based ciphertext is based, and
wherein the server-side session key is based on a hash value of a character string including one or more of the ID-based ciphertext, the server ID, the encryption character string, the first session key element, the second session key element, a server-side encryption element, and the server-side third session key element.

2. The system of claim 1, wherein the terminal-side encryption element is calculated in accordance with:

$$D=(H(ID_S))^x$$

where:
D is the terminal-side encryption element,
IDs is the server ID,
x is the terminal-side random number, and
H is a unidirectional hash value.

3. The system of claim 1, wherein the encryption character string is calculated by performing an exclusive OR (XOR) operation between the terminal user authentication information and the terminal-side encryption element.

4. The system of claim 1, wherein the server is further configured to receive the ID-based ciphertext from the terminal, the ID-based ciphertext including the first session key element and the encryption character string, to calculate a server-side encryption element based on the server-side private key and the first session key element, and to restore the terminal user authentication information from the encryption character string using the server-side encryption element.

5. The system of claim 4, wherein the server-side encryption element is calculated in accordance with:

$$D'=x^{Ks}$$

where:
D' is the server-side encryption element,

X is the first session key element, and
Ks is the server-side private key.

6. The system of claim 4, wherein the restored terminal user authentication information is produced from performing an exclusive OR (XOR) operation between the received encryption character string and the server-side encryption element.

7. The system of claim 1, wherein the server authenticates the terminal according to whether the restored terminal user authentication information matches previously stored authentication information of the terminal.

8. The system of claim 1, wherein the server-side third session key element is calculated at least in part by exponentiating a base of the first session key element to a power of the server-side random number.

9. The system of claim 1, wherein the terminal receives the second session key element from the server and generates a terminal-side third session key element and a terminal-side session key from the received second session key element.

10. The system of claim 9, wherein the terminal-side third session key element is calculated at least in part by exponentiating a base of the second session key element to a power of the terminal-side random number.

11. The system of claim 9, wherein the terminal-side session key is based on a hash value of a character string including one or more of the terminal ID, the server ID, the encryption character string, the first session key element, the second session key element, the terminal-side encryption element, and the terminal-side third session key element.

12. A method, for exchanging a key based on terminal user authentication information, comprising:
generating, by a terminal implemented by at least one hardware processor, an ID-based ciphertext corresponding to the terminal user authentication information, using a terminal-side random number and a server ID;
decrypting, by a server implemented by at least one hardware processor, the ID-based ciphertext generated by the terminal, using a server-side private key corresponding to the server ID, to produce restored terminal user authentication information;
authenticating, by the server, the terminal, using the restored terminal user authentication information, whereby the terminal is an authenticated terminal;
generating a server-side session key corresponding to the authenticated terminal,
calculating a second session key element from a server-side random number when the terminal is authenticated; and
generating a server-side third session key element from the server-side random number and a first session key element;
wherein the generating of the ID-based ciphertext further comprises:
calculating the first session key element from the terminal-side random number;
generating a terminal-side encryption element from the server ID and the terminal-side random number, and
combining the terminal user authentication information with the terminal-side encryption element to generate an encryption character string upon which the ID-based ciphertext is based, and
wherein the server-side session key is based on a hash value of a character string including one or more of the ID-based ciphertext, the server ID, the encryption character string, the first session key element, the second session key element, a server-side encryption element, and the server-side third session key element.

13. The method of claim 12, further comprising calculating the terminal-side encryption element in accordance with:

$$D = (H(ID_S))^x$$

where:
D is the terminal-side encryption element,
IDs is the server ID,
x is the terminal-side random number, and
H is a unidirectional hash value.

14. The method of claim 12, further comprising calculating the encryption character string by performing an exclusive OR (XOR) operation between the terminal user authentication information and the terminal-side encryption element.

15. The method of claim 12, wherein the restoring of the terminal user authentication information further comprises:
receiving the ID-based ciphertext from the terminal, the ID-based ciphertext including the first session key element and the encryption character string;
calculating a server-side encryption element based on the server-side private key and the first session key element; and
restoring the terminal user authentication information from the encryption character string using the server-side encryption element.

16. The method of claim 15, further comprising calculating the server-side encryption element in accordance with:

$$D' = x^{Ks}$$

where:
D' is the server-side encryption element,
X is the first session key element, and
Ks is the server-side private key.

17. The method of claim 15, wherein the producing of the restored terminal user authentication information from the encryption character string is performed using an exclusive OR (XOR) operation between the encryption character string and the server-side encryption element.

18. The method of claim 12, wherein the authenticating of the terminal includes determining whether the restored terminal user authentication information matches previously stored authentication information of the terminal.

19. The method of claim 12, further comprises calculating the server-side third session key element at least in part by exponentiating a base of the first session key element to a power of the server-side random number.

20. The method of claim 12, further comprising:
receiving, at the terminal, the second session key element; and
generating a terminal-side third session key element and a terminal-side session key from the received second session key element.

21. The method of claim 20, further comprising calculating the terminal-side third session key element at least in part by exponentiating a base of the second session key element to a power of the terminal-side random number.

22. The method of claim 20, wherein the terminal-side session key is based on a hash value of a character string including one or more of the terminal ID, the server ID, the encryption character string, the first session key element, the second session key element, the terminal-side encryption element, and the terminal-side third session key element.

23. A computer program product comprising a non-transitory computer readable medium and instructions configured to enable a computer to implement operations including:
- generating, by a terminal, ID-based ciphertext, corresponding to terminal user authentication information, using a terminal-side random number and a server ID; and
- decrypting the ID-based ciphertext, using a server-side private key corresponding to the server ID, to produce restored terminal user authentication information;
- authenticating the terminal, using the restored terminal user authentication information, whereby the terminal is an authenticated terminal; and
- generating a server-side session key corresponding to the authenticated terminal;
- calculating a second session key element from a server-side random number when the terminal is authenticated; and
- generating a server-side third session key element from the server-side random number and a first session key element, wherein the generating of the ID-based ciphertext further comprises:
- calculating the first session key element from the terminal-side random number;
- generating a terminal-side encryption element from the server ID and the terminal-side random number; and
- combining the terminal user authentication information with the terminal-side encryption element to generate an encryption character string upon which the ID-based ciphertext is based, and wherein the server-side session key is based on a hash value of a character string including one or more of the ID-based ciphertext, the server ID, the encryption character string, the first session key element, the second session key element, a server-side encryption element, and the server-side third session key element.

* * * * *